G. T. LEWIS & W. J. MENZIES.
Manufacture of Bicarbonate of Soda.
No. 202,356. Patented April 16, 1878.
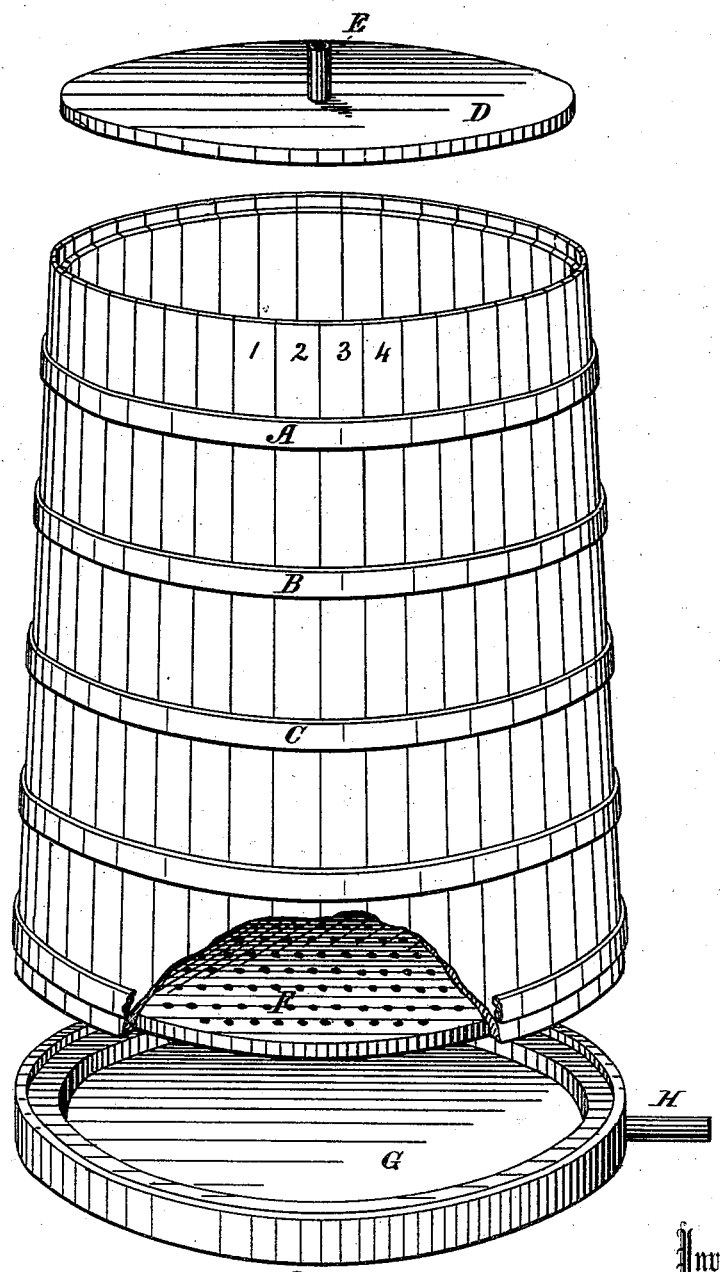

UNITED STATES PATENT OFFICE.

GEORGE T. LEWIS, OF PHILADELPHIA, PENNSYLVANIA, AND WILLIAM J. MENZIES, OF ST. HELEN'S, ENGLAND; SAID MENZIES ASSIGNOR TO SAID LEWIS.

IMPROVEMENT IN MANUFACTURE OF BICARBONATE OF SODA.

Specification forming part of Letters Patent No. 202,356, dated April 16, 1878; application filed October 4, 1876.

*To all whom it may concern:*

Be it known that we, GEORGE T. LEWIS, of Philadelphia, Pennsylvania, and WILLIAM J. MENZIES, of St. Helen's, Lancashire, England, have invented a new and useful Improvement in the Manufacture of Bicarbonate of Soda; and we do hereby declare the following to be a specification thereof.

In the manufacture of bicarbonate of soda the usual plan has been to take soda-crystals (sal-soda) and pass carbonic acid over them, thus liberating the water of crystallization, and forming bicarbonate of soda. It has also been proposed to form bicarbonate of soda by passing carbonic acid through a mixture of carbonate of soda and of soda-crystals. This process has never been successfully carried out, so as to produce a good article.

We have discovered that the carbonate of soda, or soda-ash, made by the ammonia process, as hereinafter mentioned, can be mixed with soda-crystals (sal-soda) in the proportion of three parts ammonia, carbonate of soda, and one of sal-soda, and, treated with carbonic acid, will produce a fine article of bicarbonate of soda.

What we call "ammonia carbonate of soda" is carbonate of soda produced by the reaction of carbonate of ammonia on common salt (chloride of sodium.) We take one part of sal-soda, in crystals, mix it with three parts, by weight, of carbonate of soda made by the ammonia process, as above mentioned, and we place the mixture in a carbonizer, as hereinafter described, and pass the carbonic acid, made in the ordinary manner, through the mass. The carbonic acid unites with the soda, releases the water, and also adds another equivalent of carbonic acid to the solution of carbonate of soda there present, thus converting the whole mass into bicarbonate of soda. Difficulty is experienced, however, in removing the bicarbonate of soda thus produced from the carbonizer, by reason of its rigidity and adhesion to the sides and bottom of the carbonizer. We therefore construct a carbonizer with removable sides or partitions, made of either wood, slate, or iron, so that when the mass becomes hardened the sides or partitions can be removed bodily, and the masses contained in the carbonizer can be easily removed.

This carbonizer, as constructed by us, is shown in the drawings, and consists of a tank formed of staves 1 2 3 4, &c., bound together by removable bands or hoops A B C, &c., and provided at its top with a removable head, D, having an orifice, E, and provided at its bottom with a removable perforated head, F, and provided, further, with a supplemental head, G, which head is a concaved or dish-shaped device, into which the end of the tank fits and rests, in such manner as to leave an open space between the perforated head F and the supplemental head G. The supplemental head G is provided with an orifice, H. The heads E and F are fitted to the tank in such manner as to render the tank practically in a large degree air-tight.

In operation, carbonic acid is forced through the aperture E, and is drawn through the mass contained in the tank by means of an exhaust attached to the aperture H. The process of forcing the carbonic acid being completed, the removable heads and bands are removed from the tank, and the staves separately removed from around the formed mass of bicarbonate of soda. Thus the tank, while being easily emptied, is preserved for further operations.

Having thus described our invention, what we claim, and desire to secure by Letters Patent, is—

1. The process of making bicarbonate of soda by passing carbonic-acid gas through a mixture of sal-soda and carbonate of soda made by the ammonia process, as above described.

2. An apparatus for applying carbonic-acid gas in the manufacture of bicarbonate of soda from a mixture of sal-soda and carbonate of soda made by ammonia process, consisting of a tank or vessel having removable sides and removable orificed heads D and G, and a perforated head, F, substantially as shown and described.

GEORGE T. LEWIS.
WILLIAM J. MENZIES.

Witnesses:
SAMUEL BELL,
ALBERT PANCOAST.